May 28, 1935.  A. E. DREXEL  2,003,254
X-RAY CASSETTE
Filed Nov. 14, 1934
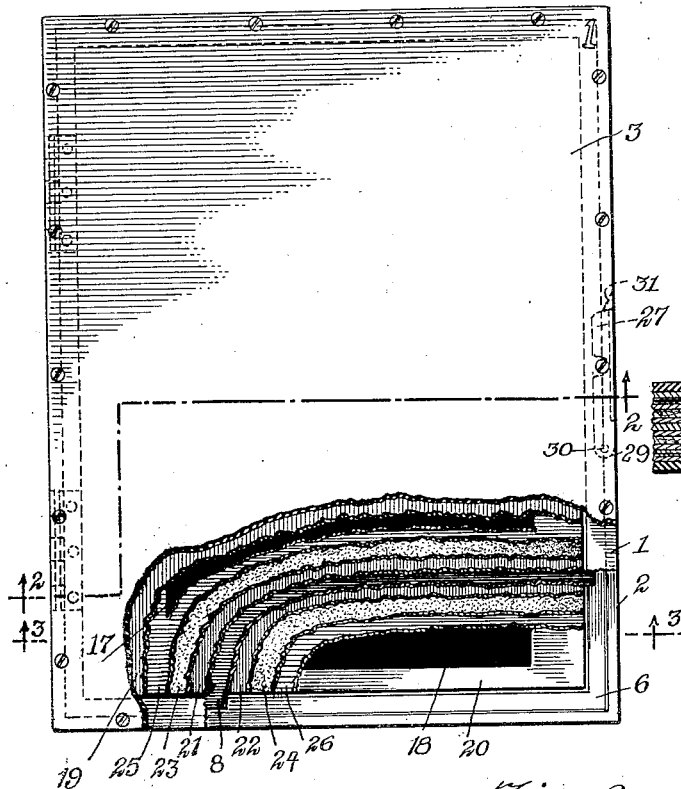
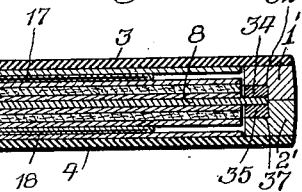
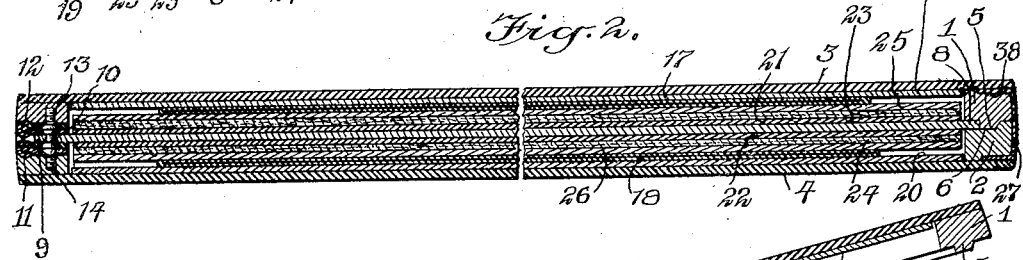
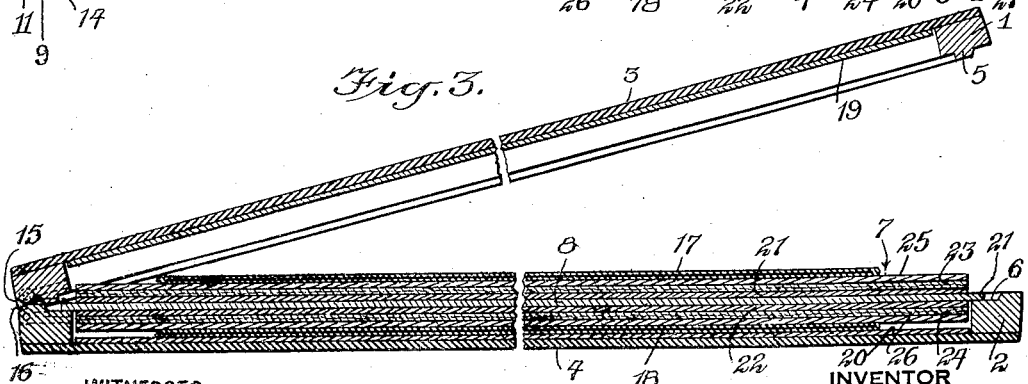
WITNESSES
INVENTOR
A. E. Drexel
BY
ATTORNEYS Patented May 28, 1935

2,003,254

UNITED STATES PATENT OFFICE 2,003,254

X-RAY CASSETTE

Adolph E. Drexel, Palatka, Fla.

Application November 14, 1934, Serial No. 753,060

5 Claims. (Cl. 250—34)

This invention relates to improved film holders and particularly to an improved X-ray cassette or holder wherein the parts are so formed that two films are held in the same cassette, with the parts so positioned that the exposure of one film will not affect the other.

An object of the invention is to provide an X-ray cassette which is comparatively thin but strong and may hold a plurality of films, with the parts so arranged that the exposure of one film will not affect the others.

Another object of the invention is to provide an X-ray cassette having an outer casing and a swinging dividing member with intensifying screens and cushioning fillers for causing the films to be firmly held in place when the frame is closed.

An additional object more specifically is to provide an X-ray cassette formed to receive a plurality of X-ray plates or films, and provided with means at the periphery for preventing the entrance of light.

In the accompanying drawing—

Figure 1 is a plan view of an X-ray cassette disclosing an embodiment of the invention, certain parts of the cassette being broken away to illustrate the various interior constructions;

Fig. 2 is a sectional view through Fig. 1, on the line 2—2, the same being on an enlarged scale;

Fig. 3 is a sectional view through Fig. 1, on the line 3—3, the same being on an enlarged scale with part of the frame shown open;

Fig. 4 is a view similar to the right-hand end of Fig. 2 but disclosing a slightly modified construction.

In forming the X-ray cassette it is desirable to have a construction which may be readily handled and may be used to take various pictures. Where the cassette is used in a diaphragm apparatus, it is necessary that the same be comparatively thin, for instance, of less thickness than one inch. It will, therefore, be understood that the present device may be of appreciable less thickness than one inch, or of various other thicknesses, without departing from the spirit of the invention.

Referring to the accompanying drawing by numeral, 1 and 2 indicate metal frames preferably formed from cast aluminum, and 3 and 4 indicate front and back plates formed of any suitable material, as, for instance, bakelite, rubber, or other material which will be impervious to visible light rays but will permit the X-rays to readily pass. The frame 1 is provided with an annular bead 5 adapted to fit into an annular groove 6 formed in the frame 2. By this construction the parts overlap, as shown at the right of Fig. 2, and thereby prevent the entrance of visible light rays. The frames 1 and 2 with their plates 3 and 4 form a housing and centrally at this housing there is provided a division or separating structure 7, which structure is provided with a metallic plate 8, preferably steel, and which overlaps the inner edges of the frames 1 and 2, as shown in Fig. 2, and as illustrated in this figure it is provided with an extension 9 for receiving the various screws or rivets 10 which also pass through one leaf of each of the hinges 11 and 12. The other leaf of each of the hinges is connected by screws 13 and 14 with the frames 1 and 2. It will be observed that the knuckles of the hinges are set inwardly from the edge and the edge is cut away at 15 and 16, so as to allow the housing to open sufficiently so that the frames 1 and 2 will be set at right angles to each other. This will permit the ready insertion or removal of the X-ray plates or films 17 and 18.

Arranged interiorly of the frame 1, is an X-ray intensifying screen 19, and likewise arranged interiorly of the frame 2, against the interior surface of plate 4 is positioned an intensifying screen 20. These screens may be held in place by adhesive or other means. Thin sheets of lead, 21 and 22, are secured to the steel plate 8 by adhesive or other means, and on the top of the lead sheets are arranged more or less spongy or resilient sheets 23 and 24. The resilient sheets may be cardboard, asbestos, felt, or other material, and may be held in place by adhesive. Also there are provided X-ray intensifying screens 25 and 26, which are secured by adhesive or other means to the sheets 23 and 24.

In operation, one of the frames, as, for instance, frame 1, may be moved upwardly to the position shown in Fig. 3, or to a higher position, and an X-ray plate inserted. The frame may then be lowered and the entire cassette turned over and frame 2 raised and another X-ray plate inserted, so that the two X-ray plates will appear as indicated at 17 and 18 in Figs. 2 and 3. After the plates have been inserted, the device is ready for use and the frames 1 and 2 are held closed by a suitable U-shaped structure 27 which straddles part of the frames as indicated in dotted lines in Figs. 1 and 2. The frames are cut away at 38 to permit this U-shaped structure to engage the frames and not protrude therefrom. An extension 29 is provided on the U-shaped straddling member 27, said extension and a shaft 30 pivotally mounting the U-shaped member in place. As indicated in Fig. 1 the frames are also cut away at 31, so as to permit the thumb or finger nail to be inserted and pressed against the member 27 so as to move the same to an outer position. After the X-ray plates have been placed in position, this locking structure is moved to a closed position and then the cassette is ready for use.

In order to prevent any confusion as to which plate is exposed, the respective sides of the cassette are numbered as indicated in Fig. 1. The side which is uppermost in Fig. 1 is provided with the numeral "1" at the right-hand upper corner. The opposite face is provided with the numeral "2". These numerals may be arranged in any desired manner but are so positioned that they will not appear on the X-ray plate when a photograph is taken.

It will be evident that when the cassette has been loaded two exposures may be readily taken. The cassette is placed in the desired position and the first exposure taken. The cassette is then turned over and replaced, or placed in a new position, and a second exposure taken. After this has been done the cassette with the exposed plates is taken into a dark room and the plates developed in the usual manner. Also, if desired, the cassette may be reloaded in the dark room ready for use.

In Fig. 4 a slightly modified construction is shown, which is identical with that shown in Fig. 2 except that the frames 1' and 2' are provided with cutaway portions or notches 32 and 37 and in the respective notches are placed gaskets 34 and 35, said gaskets being felt or other material and adapted to be compressed against the outer edge of the metallic plate 8, so as to provide a light-tight connection at this point. In the structure shown in Fig. 2, the bead 5 overlaps part of the frame 2 so as to present a light-tight structure, the same coacting with the extension of plate 8.

I claim:

1. An X-ray cassette, comprising a pair of interlocking frames, means for hingedly connecting said frames along one edge, means at the opposite edges for disengageably locking said opposite edges together, a covering plate for each of said frames, a division member arranged interiorly of said frames, said division member being provided with a central steel plate, a lead plate on each side of said steel plate, a cushioning member mounted on each of the lead plates, and an intensifying screen positioned on each of said cushioning members and an intensifying screen secured to the inner face of each of said covering plates, X-ray plates being adapted to be placed between the respective pairs of intensifying screens and slightly pressed by said cushioning members so as to be held against accidental movement.

2. A cassette for films or X-ray plates, comprising a housing divided into two parts, means for hingedly connecting said parts together, said housing being provided with overlapping members at the point of contact to prevent the entrance of visible light rays, and a dividing structure arranged in said housing, said dividing structure being provided with a central metallic plate having its edges resting on the housing, a sheet of material impervious to X-rays arranged on each side of said metallic plate, and cushioning sheets arranged on the last-mentioned sheets, said cushioning sheets acting to resiliently press X-ray plates when the housing is closed, whereby they cannot shift independently of the housing.

3. A cassette for X-ray plates, films, or the like, comprising a housing divided into two parts, hinge means for connecting said parts together along one edge, locking means for connecting said parts together near the opposite edge, and means arranged centrally between said two parts for supporting an X-ray plate, said means including sheets of material which are impervious to X-rays, whereby when one side of the cassette is being exposed the film on the opposite side will be unaffected.

4. A cassette formed comparatively thin and provided with a housing and a dividing member arranged within the housing, means for clamping the housing together and said dividing member in place, said dividing member being provided with resilient means for holding X-ray plates against shifting when the housing is closed and also with a sheet of material impervious to X-rays, whereby one plate may be exposed at a time.

5. A cassette provided with a housing formed with a pair of frames of cast aluminum, one of said frames having a rabbet and the other a bead, said bead being adapted to fit into the rabbet when the frames are closed, a hinge structure on one edge of said frames for hingedly connecting the frames together, a swinging clamp at the opposite edge for locking said frames together, a sheet of material connected to each frame to present top and bottom covers, said sheets of material being substantially non-resistant to the passage of X-rays, a sheet of steel connected to said hinge structure, said sheet having one edge fitting into said rabbet, a sheet of lead arranged on each side of said sheet of steel and fitting thereover except at the edges, a cushioning member carried by each of the sheets of lead, an X-ray intensifying screen carried by each cushioning member, and an X-ray intensifying screen mounted on the inner surface of said top and bottom covering members.

ADOLPH E. DREXEL.